Dec. 16, 1958 W. F. MAHAN 2,864,153
HOB
Filed Jan. 24, 1955

INVENTOR.
William F. Mahan
BY
Carlson, Pitzner, Hubbard Wolfe
ATTORNEYS

United States Patent Office 2,864,153
Patented Dec. 16, 1958

2,864,153

HOB

William F. Mahan, Rockford, Ill., assignor to Barber-Colman Company, Rockford, Ill., a corporation of Illinois Application January 24, 1955, Serial No. 483,505

3 Claims. (Cl. 29—103)

This invention relates to the hobbing of spur and helical gears and the general object is to provide a hob which will generate the gear teeth of fine pitch gears and at the same time machine the tops of the teeth to a predetermined size or contour.

A more detailed object is to provide a hob having, in addition to the regular set of groove forming teeth, a set of auxiliary cutting edges arranged in a novel manner between the hobbing teeth to engage and mill off the tops of the teeth to a desired contour during the hobbing operation.

The invention also resides in the novel arrangement of the main and auxiliary teeth to enable the gear tooth cutting and topping operations to be performed simultaneously.

Other objects and advantages of the invention will become apparent from the following detailed description taken in connection with the accompanying drawings, in which Figure 1 is a fragmentary perspective view of the improved hob.

Figure 3:
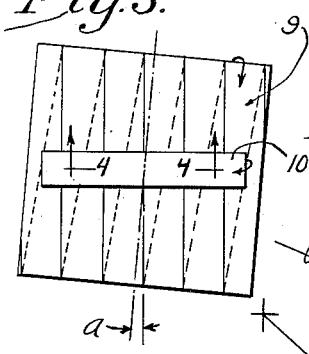
Fig. 3 is a diagrammatic view of the hob and an associated gear blank.
Figure 5:
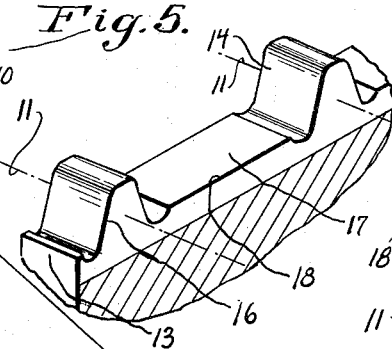
Fig. 5 is an enlarged fragmentary perspective of a part of the hob.

For purposes of illustrating the present invention, the drawings show a hob of the type commonly used for milling away metal from a cylindrical blank 10 to generate the teeth of a fine pitch gear. The hob indicated generally at 9 comprises a body 12 adapted to be fastened to the arbor of a hobbing machine and fluted around its periphery to form ribs 13 parallelling each other and the hob axis and each having a series of laterally spaced teeth 14 along its outer edge. The cutting edges 16 of the hob teeth 14 are shaped in cross section to generate the interdental spaces 15 or root portions of the gear teeth of the desired cross section when the hob and gear blank are rotated in synchronism and fed relative to each other as indicated by the arrows in Fig. 3 while the two are supported in an ordinary gear hobbing machine.

In hobs of the type shown, the corresponding teeth on the successive ribs 13 are offset progressive and inclined relative to the hob axis so as to be centered on a line 11 which extends helically around the hob at the usual lead angle a. Thus, the teeth of one helical row act successively to generate one of the interdental spaces 15 of the gear while the blank is being fed across the hob. The lateral spacing of the teeth 14 on each rib corresponds to the pitch of the teeth 8 so that the teeth of adjacent helical rows operate on circumferentially spaced portions of the gear blank to generate the successive interdental spaces 15 in the course of the standard hobbing operation.

In accordance with the present invention, the tooth arrangement on a conventional hob as described above is modified to provide additional teeth 17 with cutting edges 18 so disposed in a novel relation with respect to the teeth 14 as to mill off the tops of the teeth 8 which are generated by the hob teeth 14. To this end, part of the teeth 14 on each rib 13 of the conventional hob are omitted to space the remaining teeth apart laterally a distance substantially greater than the pitch of the gear to be formed and intervening and shorter auxiliary teeth 17 are formed on the ribs 13 with the cutting edges 18 thereof properly positioned in relation to the helical rows of hobbing teeth 14 to mill off the tops 19 of the gear teeth 8 that are formed by the action of the hob teeth of two adjacent helical rows. To minimize the length of the hobbing operation, the teeth 14 which mill out of interdental spaces 15 are, in the present instance, spaced apart along the ribs a distance equal to three times the pitch of the gear teeth 11 and the cutting edges 18 of the auxiliary or topping teeth 18 are disposed midway between the adjacent hob teeth of each longitudinal row. If desired, the auxiliary edges 18 may as shown be somewhat longer than the width of the top 19 of the gear which the edge engages in the course of the hobbing operation, this width in the present instance being nearly twice the pitch of the gear that is formed.

Figure 4:
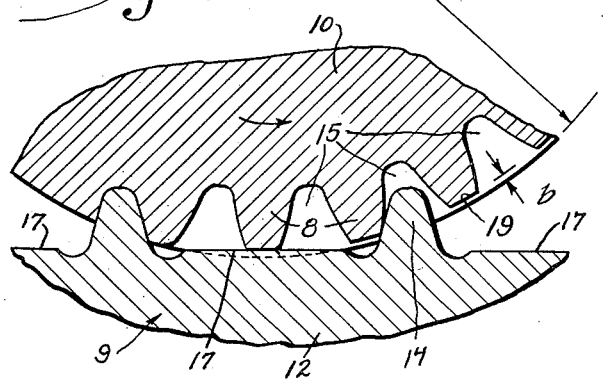
Fig. 4 is an enlarged fragmentary section taken along the line 4—4 of Fig. 3.

Where, as here, the tops of the gear teeth hobbed by the teeth 14 are to be flattened, the edges 18 are made substantially straight and so disposed relative to the hob axis as to space the finished top 19 of the gear tooth properly. The original diameter of the gear blank 10 of course exceeds the final diameter of the hobbed gear by an amount b (Fig. 4) so as to allow a proper amount of stock for milling off by the auxiliary edges 18 to produce the desired final contour of the tops of the gear teeth and locate the tops at the desired diameter.

Figure 1:
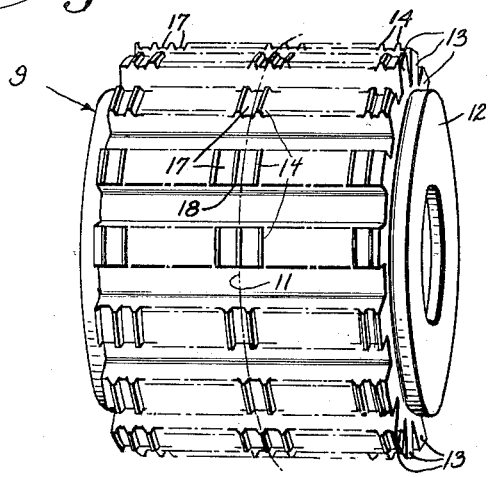
Figure 2:
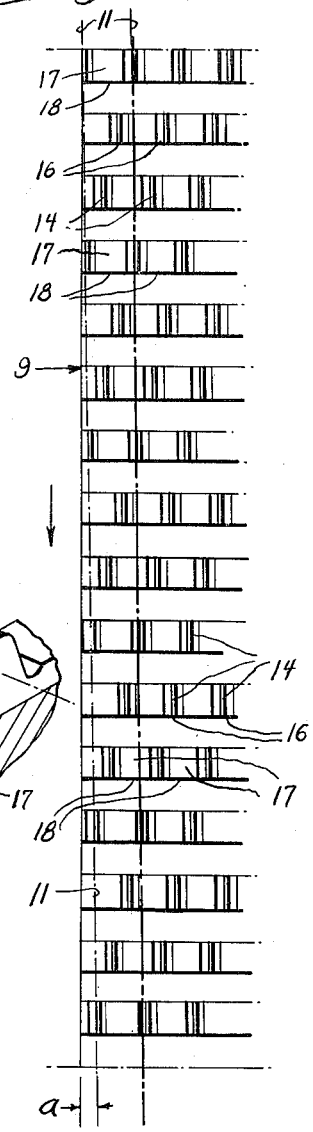
Fig. 2 is a development view of the hob teeth.

It will be observed from Fig. 2 that the edges 18 for milling the tops on the gear teeth span the space between the two helical center lines 11 which are disposed between the adjacent hobbing teeth 14. Thus, the auxiliary cutting edges 18 are positioned to mill off a layer b of metal from the tops of the gear teeth 11 after generation thereof by the hob teeth 14 in the adjacent helical rows which straddle the cutting edge 18.

I claim as my invention:

1. A cutter for hobbing gear teeth of predetermined pitch with tops of a desired contour comprising a rotary body, a multiplicity of first teeth rigid with said body and arranged in a plurality of generally parallel rows extending along the axis of the body and spaced circumferentially around the latter, the teeth of each row having cutting edges lying in a common plane and shaped to generate the interdental spaces between the teeth of said gear, said teeth in each row also being spaced laterally from each other a distance at least equal to three times said predetermined pitch to locate the teeth of successive rows along different circumferential lines extending helically around said body, and second teeth rigid with said body and each disposed between the adjacent teeth of said first row and also spaced along said helical lines, each of said second teeth having a cutting edge lying in the plane of the cutting edges of the associated row of first teeth and engageable with the teeth of said gear and shaped to contour the top on each of the gear teeth generated by said first teeth.

2. A cutter for hobbing gear teeth of predetermined pitch with the tops of a desired contour comprising a rotary body, a plurality of cutting teeth on said body each shaped to correspond to the interdental spaces between said gear teeth, said teeth being arranged in a plurality of parallel rows extending helically around said body and also in a plurality of parallel rows extending longitudinally of the axis of said body, the teeth of said longitudinal rows being laterally spaced apart by an amount equal to at least three times said predetermined pitch, and additional teeth on said body each disposed between the adjacent teeth in each of said longitudinal rows and also angularly spaced around said body to lie along one of said helical rows, each of said additional teeth having a cutting edge engageable only with the top of the gear tooth generated by the adjacent helical rows of said first teeth and operable during hobbing of the gear to mill said top to a contour corresponding to the shape of said cutting edge.

3. A cutter for hobbing gear teeth of predetermined pitch with tops of a desired contour comprising a rotary body, a plurality of cutting teeth on said body each shaped to correspond to the interdental spaces between said gear teeth, said teeth being arranged in a plurality of parallel rows extending helically around said body and also in a plurality of parallel rows extending longitudinally of the axis of said body, the teeth of said longitudinal rows being laterally spaced apart by an amount equal to at leasts three times said predetermined pitch, and additional teeth in each of said longitudinal rows each disposed midway between the center lines of two adjacent helical rows and operable to engage and mill the tops of the gear tooth generated by the teeth of said last mentioned rows.

References Cited in the file of this patent

UNITED STATES PATENTS

| | | |
|---|---|---|
| 1,003,130 | Zimmermann | Sept. 12, 1911 |
| 1,393,818 | Olson | Oct. 18, 1921 |
| 1,431,402 | Irvin | Oct. 10, 1922 |
| 1,760,125 | Edgar | May 27, 1930 |
| 2,112,455 | Edgar | Mar. 29, 1938 |
| 2,358,442 | Carlsen | Sept. 19, 1944 |
| 2,370,894 | Walters | Mar. 6, 1945 |